United States Patent
Atsuta et al.

(10) Patent No.: US 7,087,888 B2
(45) Date of Patent: Aug. 8, 2006

(54) ELECTRICAL DIVISION CIRCUIT FOR AN OPTICAL ENCODER

(75) Inventors: Akio Atsuta, Kanagawa (JP); Masahiko Igaki, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 247 days.

(21) Appl. No.: 10/366,735

(22) Filed: Feb. 14, 2003

(65) Prior Publication Data
US 2003/0155492 A1 Aug. 21, 2003

(30) Foreign Application Priority Data
Feb. 18, 2002 (JP) ............... 2002-040087

(51) Int. Cl.
*G01D 5/34* (2006.01)
(52) U.S. Cl. ............... 250/231.13
(58) Field of Classification Search .......... 250/231.13–231.19; 341/13
See application file for complete search history.

(56) References Cited

U.S. PATENT DOCUMENTS

| | | | |
|---|---|---|---|
| 4,733,070 A * | 3/1988 | Ookawa et al. | 250/231.16 |
| 5,067,089 A | 11/1991 | Ishii et al. | 702/126 |
| 6,355,927 B1 * | 3/2002 | Snyder | 250/231.13 |

FOREIGN PATENT DOCUMENTS

| | | | |
|---|---|---|---|
| JP | 2-104017 | | 4/1990 |
| JP | 3-276017 | | 12/1991 |
| JP | 06-317432 | * | 11/1994 |
| JP | 2000-105134 A | * | 4/2000 |

* cited by examiner

*Primary Examiner*—Thanh X. Luu
(74) *Attorney, Agent, or Firm*—Morgan & Finnegan, L.L.P.

(57) ABSTRACT

In an optical encoder, an output signal of the encoder and a signal inverted from the output signal are respectively inputted to one input terminal and the other input terminal of a comparator constituting a circuit for electrically decomposing the output signal of the encoder, whereby it is possible to obtain a highly accurate electrical division circuit which is capable of removing the hysteresis of a comparator, noises and D.C. offset.

2 Claims, 9 Drawing Sheets

FIG. 10 PRIOR ART

ELECTRICAL DIVISION CIRCUIT FOR AN OPTICAL ENCODER

BACKGROUND OF THE INVENTION

1. Field of the Invention

The present invention relates to an optical encoder having an electrical division circuit for use in an encoder used for a displacement measurement or an angle measurement.

2. Related Background Art

A photoelectronic encoder is basically constructed by including a main scale having a first optical grating formed thereon, an index scale having a second optical grating formed thereon and arranged so as to face the main scale, a light source for irradiating the main scale with light, and a photoelectric receiving element for receiving light which has been transmitted or reflected by the optical grating of the main scale to be transmitted through the optical grating of the index scale. A system using an array of photoelectric receiving elements doubling as an index scale in a photoelectronic encoder of this sort has already been proposed, and an example thereof is shown in FIG. 10.

Figure 10:
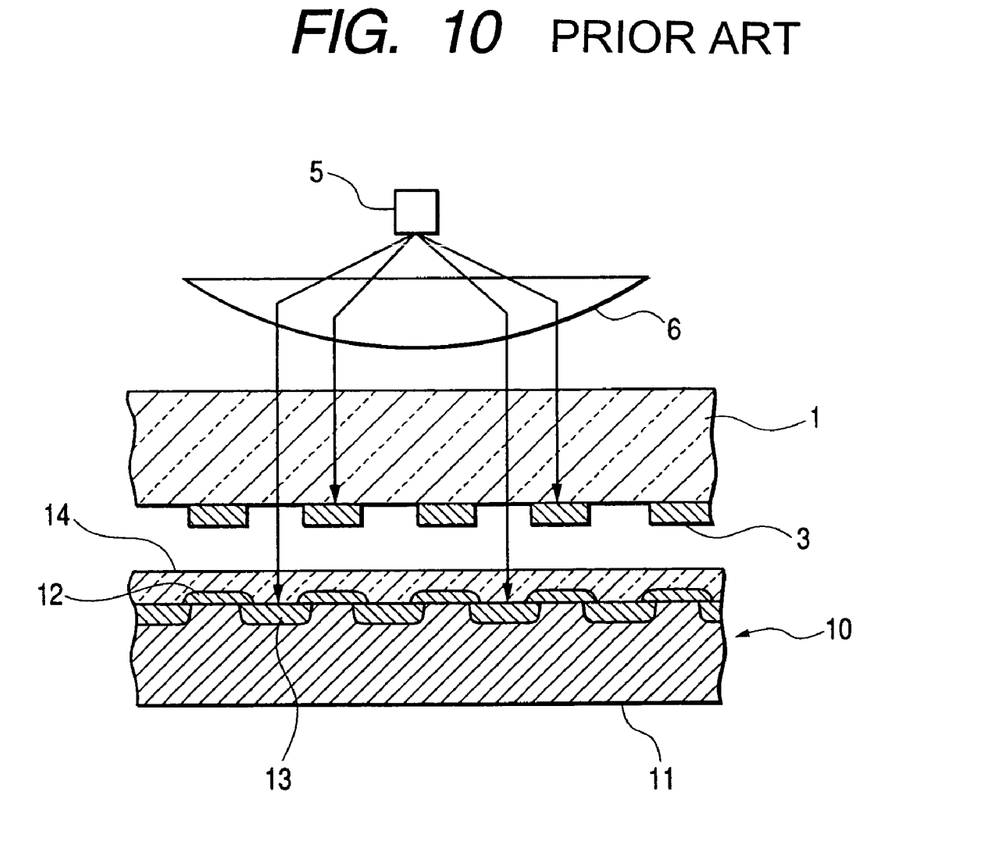
FIG. 10 is a cross sectional view showing a construction of one example of a conventional optical encoder.

A conventional optical encoder shown in FIG. 10 is such that a plurality of photoelectric receiving elements are directly formed on an index scale 10 so as for their pitch to match the pitch of an optical grating 3 of a main scale 1. That is to say, after formation of an oxide film 12 on an n type semiconductor substrate 11, the oxide film 12 is selectively removed away so as for its pitch to match the pitch of the optical grating 3, and then a p type impurity is diffused into the n type semiconductor substrate 11 with the oxide film 12 as a mask to thereby form a p type semiconductor layer 13. As a result, a photodiode is formed in the form of a pn junction between the n type semiconductor substrate 11 and the p type semiconductor layer 13. Then, a transparent current collecting layer 14 is formed over the entire surface of the n type semiconductor substrate 11 to thereby form the index scale 10.

In accordance with the conventional optical encoder, since the light emitted from the light source 5 only passes through one optical grating, the photoelectric receiving efficiency is enhanced, and the influence of noises due to the diffracted light is excluded. In addition, since the index scale 10 itself constitutes the photoelectric receiving element, the device can be miniaturized.

Figure 7:
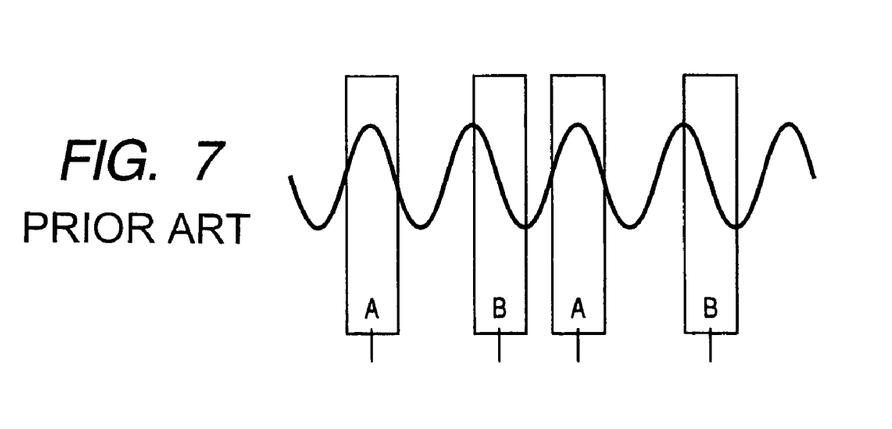
FIG. 7 is a diagram useful in explaining the relationship between an example of a pattern of a conventional photodiode array and a light and darkness pattern of detected light.

FIG. 7 shows the relationship between an example of a pattern of the photodiode array used in the above-mentioned encoder and a light and darkness pattern of detected light. In FIG. 7, photodiode groups A and B are arranged with the positional relationship in which they are 0° and 90° out of phase with the light and darkness pattern of the light, and photoelectric currents generated therein are inputted to an I-V conversion circuit (not shown).

The photoelectric currents generated with such a construction, at the time when the light and darkness pattern of the light crosses the diode groups, are converted into voltages in the I-V conversion circuit so that analog sine voltage signals which are 0° and 90° out of phase with the light and darkness pattern of the light are obtained.

Figure 8:
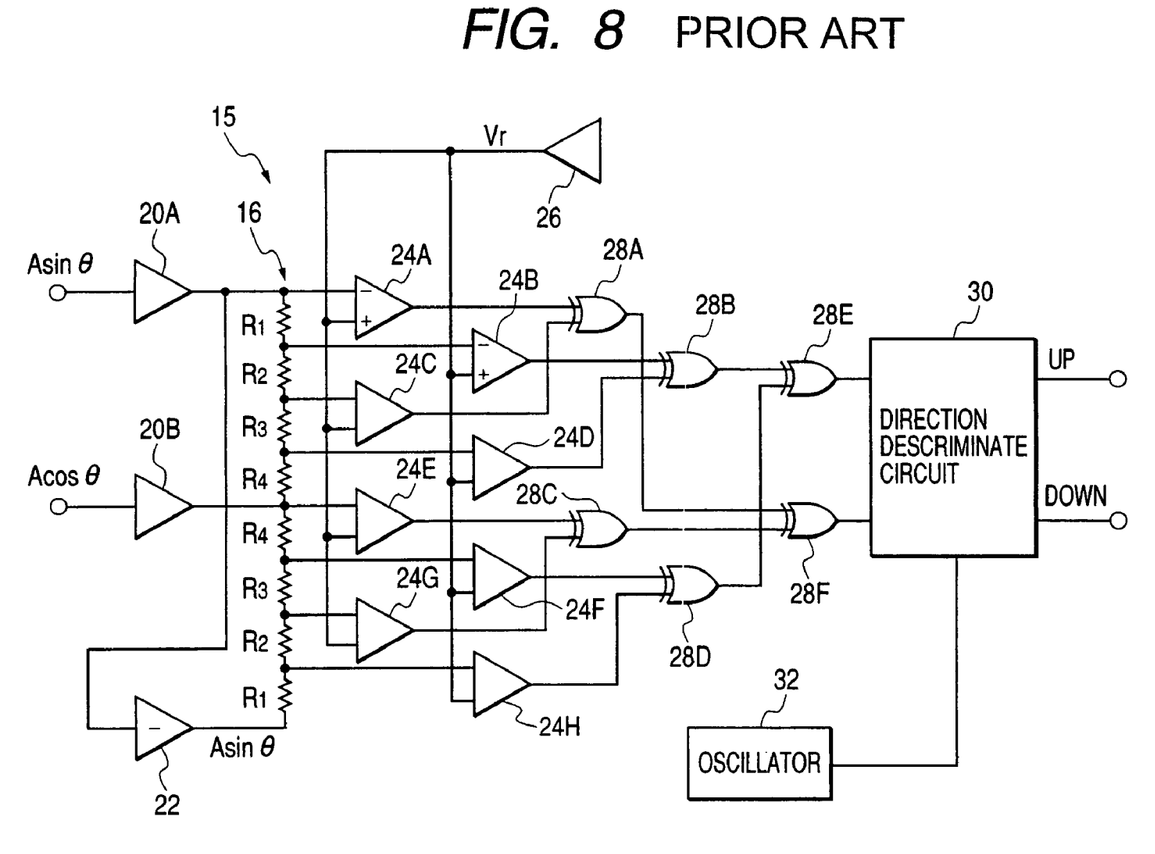
FIG. 8 is a circuit diagram showing a configuration of a conventional electrical division circuit.

FIG. 8 shows an example of a conventional resistive division circuit which is capable of dividing the pitch of a primary signal into sixteen parts.

In FIG. 8, reference numeral 20A designates a buffer amplifier for an A sin θ signal; reference numeral 20B designates a buffer amplifier for an A cos θ signal; reference numeral 22 designates an inversion amplifier for applying an −A sin θ signal obtained by inverting an output signal of the buffer amplifier 20A to a node of a resistor array 16; reference numerals 24A to 24H designate eight comparators which are provided in correspondence to nodes of the resistor array 16, respectively; reference numeral 26 designates a reference voltage setting unit for supplying a reference voltage Vr for comparison to each of the comparators; reference numerals 28A to 28F designate exclusive OR gates for composing logically output signals of the comparators 24A to 24H; reference numeral 30, a direction discriminate circuit; and 32, an oscillator.

Since in this resistive division circuit 15, resistance values of resistors R1, R2, R3 and R4 are set so as to meet the ratio of 1:0.707:0.707:1 and also 180° are divided into eight parts, in the case of 360°, sixteen division can be made.

By the way, since this resistive division circuit is disclosed in detail in Swiss Patent No. 407,569, the detailed description thereof is omitted here for the sake of simplicity.

The light and darkness pattern of the light obtained in the photoelectric receiving element group in such a manner allows the pulse signals having a higher resolution than that optically obtained to be obtained through the I-V conversion amplifier and the electrical division circuit. Hence, positional and rotational information having a high accuracy is obtained.

Figure 9:
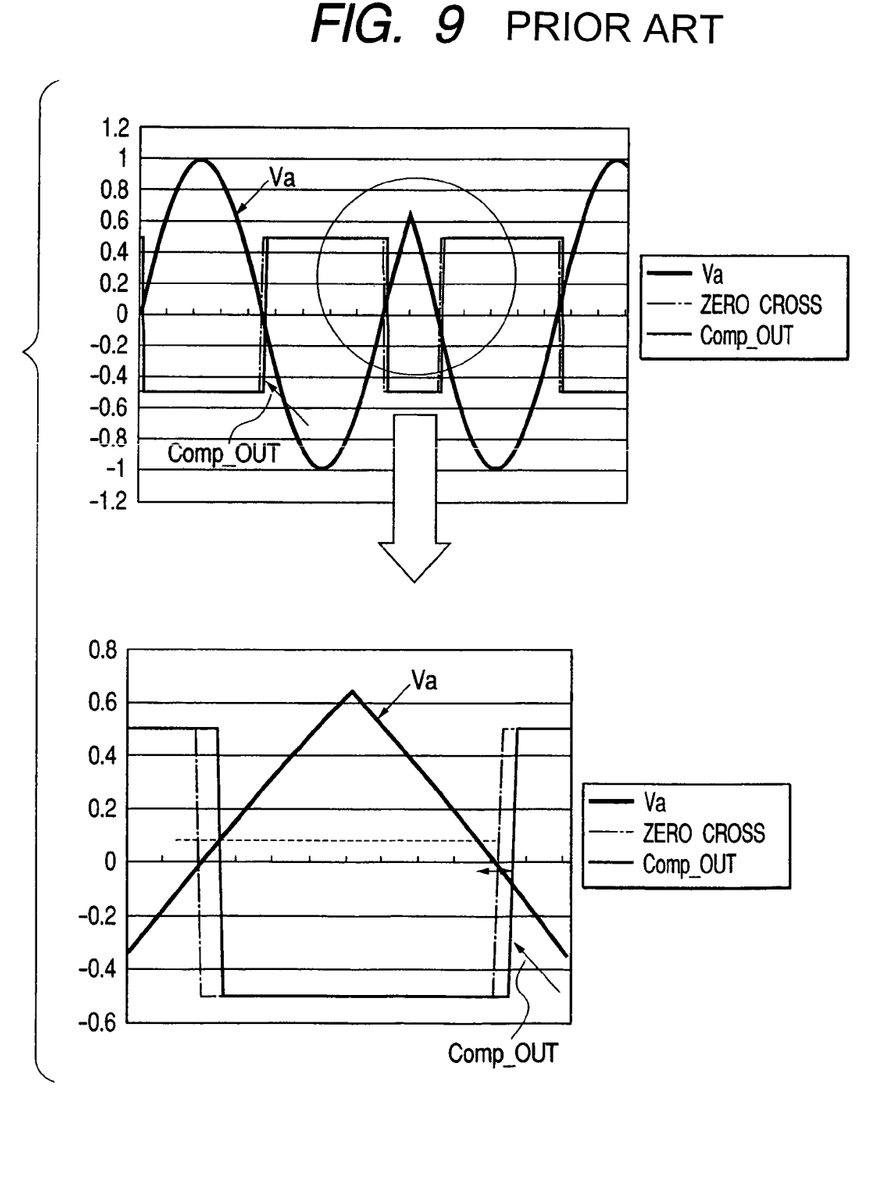
FIG. 9 is a graphical representation useful in explaining the relationship between an input signal and an output signal of a comparator 42A in a conventional electrical division circuit.

FIG. 9 shows the relationship between an input signal and an output signal of the comparator 24A of the above-mentioned resistive division circuit shown in FIG. 8.

In the figure, reference symbol Va designates an input signal to an inverting input of the comparator 24A, and reference symbol Vr designates an input signal to a non-inverting input of the comparator 24A. In this case, the level of the input signal Vr is set to 0 V.

Normally, each of these comparators has a hysteresis as a measure of coping with the chattering due to noises.

For this reason, the output signal is not switched with its polarity at zero cross, but has a certain voltage (0.1 V for the amplitude of 1 V in FIG. 9) hysteresis. Since if the rotational direction of the encoder is fixed, a quantity of shift due to the hysteresis is uniform, this seems to have no problem. However, in the resistive division circuit shown in FIG. 8, the magnitude of the input voltage of the camparator 24C is $1/\sqrt{2}$ of that of the input voltage to the comparator 24A, and hence if the same hysteresis voltage is set, then a quantity of shift will vary. In addition, if the rotational direction is changed, then as shown in FIG. 9, the polarity of the input signal Va is not changed at the position of the ideal zero cross, but is switched at a certain voltage. Here, since each of the comparators has the hysteresis, the position where the magnitude of the pulse is switched is shifted for the hysteresis.

A comparator adapted to detect a signal level is thus allowed to have a hysteresis so as to avoid the influence of signal noises generated on the input side of an electrical division circuit when an analog output signal from such an encoder head as shown in the prior art example is electrically divided by utilizing the resistive division method, to thereby suppress the generation of the chattering or the like.

However, there is encountered a problem in that since if the comparator is made to have the hysteresis, then the polarity of a pulse is switched at the position different from the position of the actual zero cross, the proper position can not be detected. In addition, there is encountered another problem in that since the switching point of a pulse when the direction is inverted as shown in FIG. 9 is largely changed due to the influence of the hysteresis, which results in a large error in the position where the direction inversion is repeated as right before the stop or the like.

SUMMARY OF THE INVENTION

In the light of the foregoing, the present invention has been made in order to solve the above-mentioned problems associated with the prior art, and it is, therefore, an object of the present invention to provide an optical encoder in which a signal 180° out of phase with a detection signal is inputted on the reference voltage side of a comparator constituting an electrical division circuit to thereby solve the problems of occurrence of the difference in the influence of hysteresis due to the amplitude and occurrence of an error during inversion of the rotational direction, resulting from the conventional hysteresis.

Other objects and constitution of the present invention will become clear by following description of the preferred embodiments of the present invention.

DESCRIPTION OF THE PREFERRED EMBODIMENTS

The preferred embodiments of the present invention will hereinafter be described in detail with reference to the accompanying drawings.

First Embodiment

Figure 1:
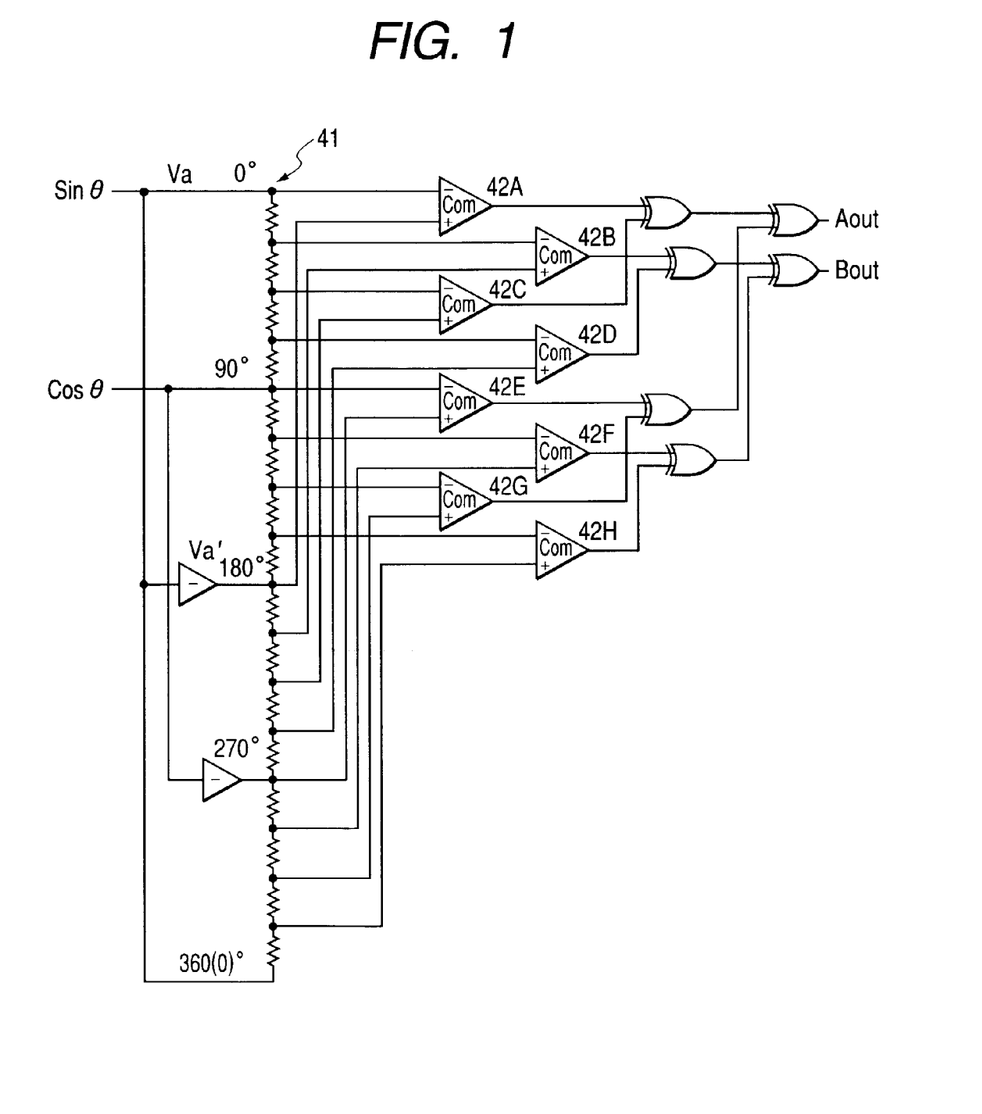
FIG. 1 is a schematic circuit diagram showing a configuration of an electrical division circuit according to a first embodiment of the present invention.
Figure 2A:
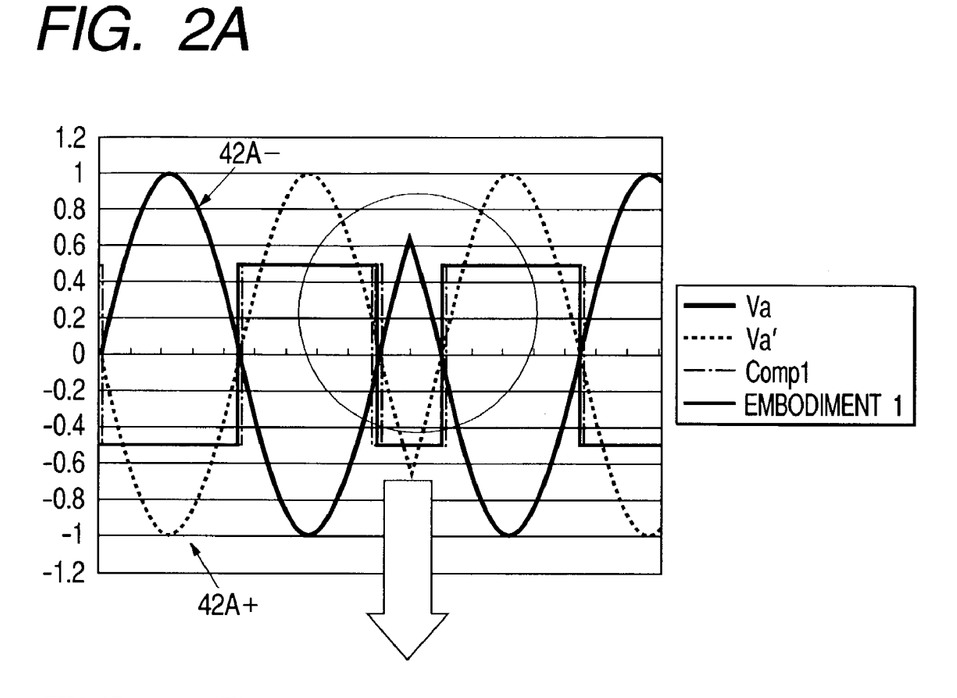
FIGS. 2A and 2B are respectively graphical representations useful in explaining the relationship between an input signal and an output signal of a comparator 42A shown in FIG. 1 in the form of comparison with a signal output in the prior art example.
Figure 2B:
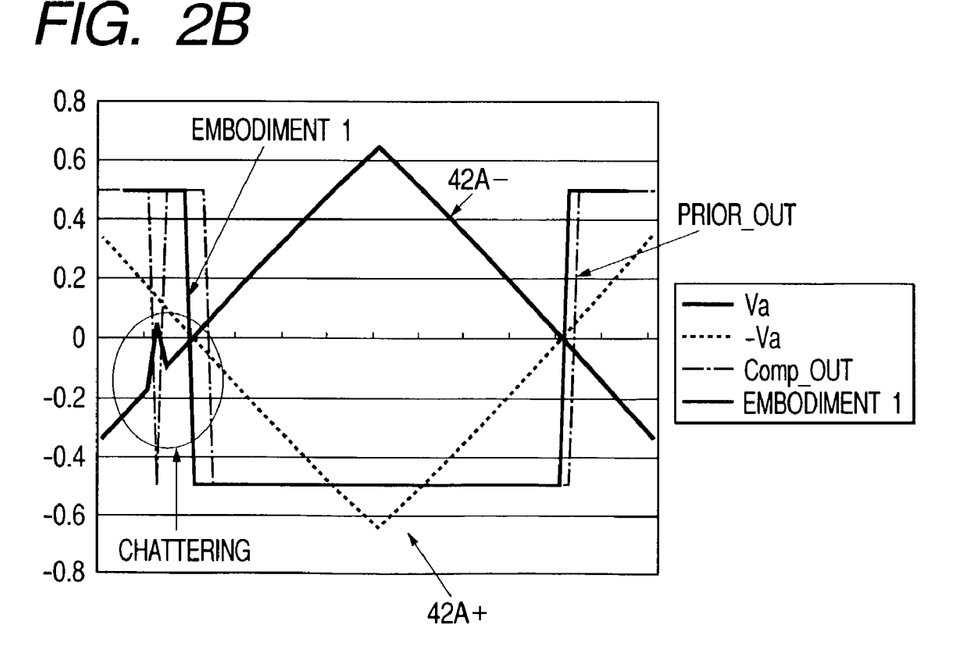

FIG. 1 is a schematic circuit diagram showing a configuration of an electrical division circuit used in the present embodiment. Conventionally, a certain reference voltage is inputted to one input terminal of a comparator for comparison. However, in the present embodiment, as shown in FIG. 1, the electrical division circuit is configured in such a way that a signal 180° out of phase with the other input signal generated by a resistor array 41 is inputted to one input terminal of a comparator. FIGS. 2A and 2B show the relationship between an input signal and an output signal of a comparator 42A shown in FIG. 1 for example in the form of comparison with the conventional signal output. From FIG. 2B, it is understood that a point at which the polarity of a pulse is switched after the inversion operation is largely changed. More specifically, with respect to the pulse switching point before the inversion operation, an inverting input of the comparator 42A is at the level of +0.05, whereas after the inversion operation, the inverting input of the comparator 42A is at the level of −0.05. In FIGS. 2A and 2B, this quantity of position shift is about 3% of one cycle of a sine wave.

Since in the case of a circuit configuration shown in FIG. 1, one cycle of the sine wave is divided into sixteen parts, this quantity of position shift corresponds to a quantity of shift of 48% in 3×16, i.e., about one half one pulse in terms of pulse divided into sixteen parts.

Conventionally, the reference voltage is inputted to the non-inverting input of the comparator 42A, whereas in the present embodiment, a signal 180° out of phase with the input signal to an inverting input of the comparator 42A is generated through a resistor array 41 to be inputted to the non-inverting input of the comparator 42A. As apparent from FIG. 2B, when a disturbance signal such as a noise is generated in the input signal to the inverting input of the comparator 42A, the chattering is generated. Since in the present embodiment, a pulse is switched through the differential operation, the input signal is hardly influenced by the above-mentioned disturbance signal. Also, since the hysteresis can also be further reduced as compared with the conventional one, the position shift during the inversion operation can also be reduced.

In addition, in the case as well where a D.C. offset is superimposed on an input signal, since in the present embodiment, the comparison is carried out through the differential operation, it becomes unnecessary to remove the D.C. offset.

When a quantity of light of a light emission portion varies, the amplitude of an output signal varies accordingly. In such a case as well, since conventionally, the hysteresis of the comparator exerts a large influence on an input signal, an error is caused. However, in the present embodiment, since the hysteresis is less, its influence is reduced accordingly.

Second Embodiment

Figure 3:
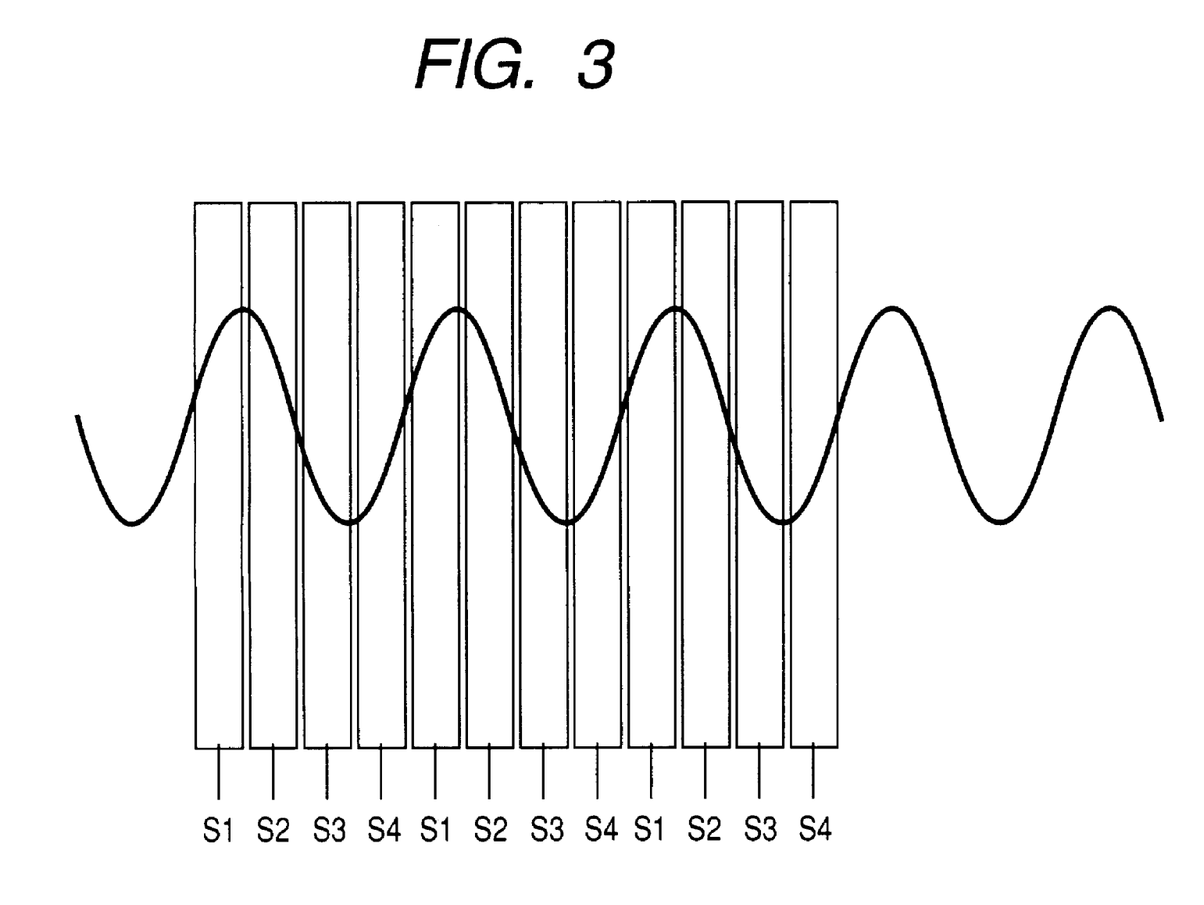
FIG. 3 is a diagram showing an example of arrangement of a photodiode array constituting a second embodiment of the present invention.

FIG. 3 is a diagram showing one example of arrangement of a photodiode array constituting an optical encoder according to a second embodiment of the present invention.

In FIG. 3, a width of a photodiode is made to correspond to one-fourth of one cycle of a light and darkness pattern of detected light. Thus, the photodiodes are arranged so as to correspond in phase to 0°, 90°, 180° and 270° with the light and darkness pattern of the light, respectively. The four photodiodes for one cycle S1, S2, S3 and S4 are decided as one segment. In FIG. 3, it is understood that three segments of photodiodes are arranged.

The light and darkness pattern of the light having one cycle corresponding to one segment of photodiodes are moved over the photodiode array so that signals corresponding in phase to 0°, 90°, 180° and 270° with the light and darkness pattern of the light, respectively, are generated in the photodiodes S1 to S4.

Figure 4:
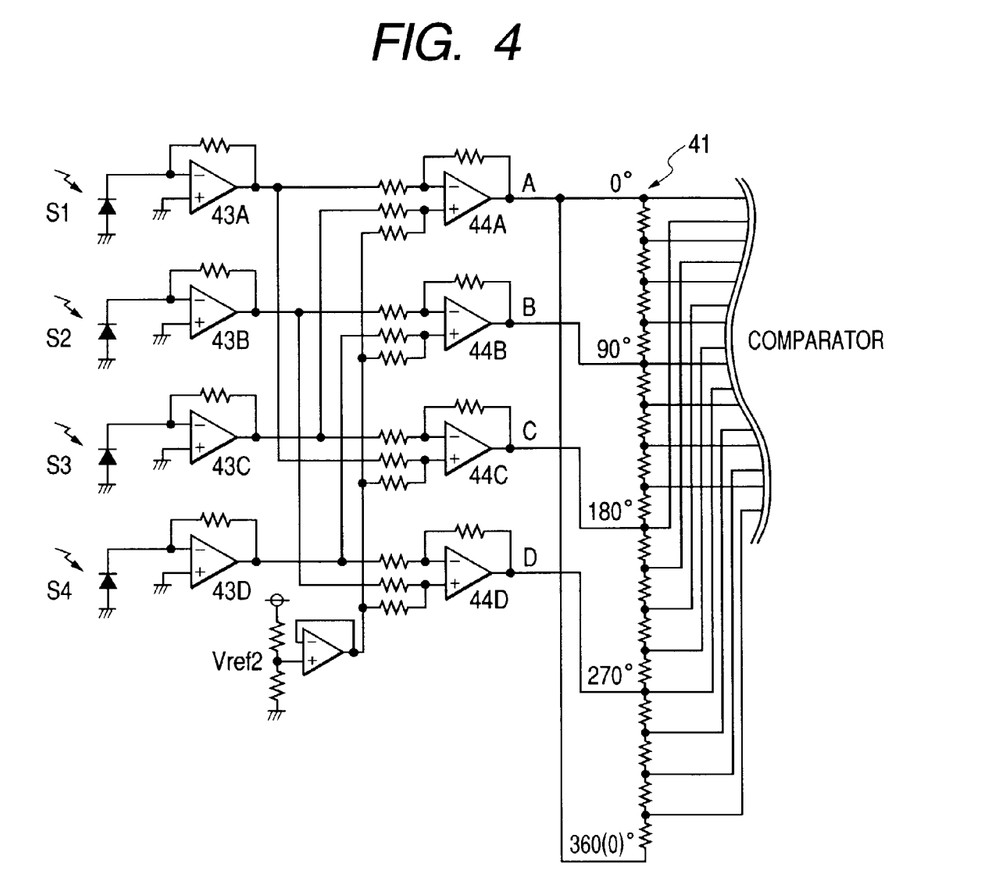
FIG. 4 is a circuit diagram showing a configuration of an electrical division circuit in the second embodiment of the present invention.

FIG. 4 is a circuit diagram showing a configuration of an electrical division circuit in the second embodiment of the present invention. In the figure, reference numerals 43A to 43D designate I-V conversion circuits for converting the photoelectric currents generated in the photodiode array 5 consisting of the photodiodes S1 to S4 into voltages, respectively. Reference numerals 44A to 44D designate differential amplifiers for arithmetically processing the voltage signals obtained through the I-V conversion in the I-V conversion circuits 43A to 43D, respectively.

The differential amplifier 44A receives as its input the output voltage signals from the I-V conversion circuits 43A at the −terminal of the 44A and 43C+a certain constant voltage Vref2 at the +terminal of 44A to carry out the arithmetic operation therefor to thereby output an output signal A.

The differential amplifier 44B receives as its input the output voltage signals from the I-V conversion circuits 43B at the −terminal of 44B and 43D+a certain constant voltage Vref2 at the +terminal of 44B to carry out the arithmetic operation therefor to thereby output an output signal B.

The differential amplifier 44C receives as its input the output voltage signals from the I-V conversion circuits 43C at the −terminal of 44C and 43A+a certain constant voltage Vref2 at the +terminal of 44C to carry out the arithmetic operation therefor to thereby output an output signal C.

The differential amplifier 44D receives as its input the output voltage signals from the I-V conversion circuits 43D at the −terminal of 44D and 43B+a certain constant voltage Vref2 at the +terminal of 44D to carry out the arithmetic operation therefor to thereby output an output signal D.

From these four output signals A to D, there are obtained the signals corresponding in phase to 0°, 90°, 180° and 270°, respectively.

In the first embodiment, the signals corresponding in phase to 180° and 270°, respectively, are obtained by inverting the phases of the output signals A (0°) and B (90°) in the inversion amplifiers to be inputted to a part of the resistor array. However, in the second embodiment, the output signals C and D corresponding in phase to 180° and 270°, respectively, similarly to the output signals A and B, are obtained by arithmetically operating the signals from the photodiode array to be inputted to a part of the resistor array.

Figure 5A:
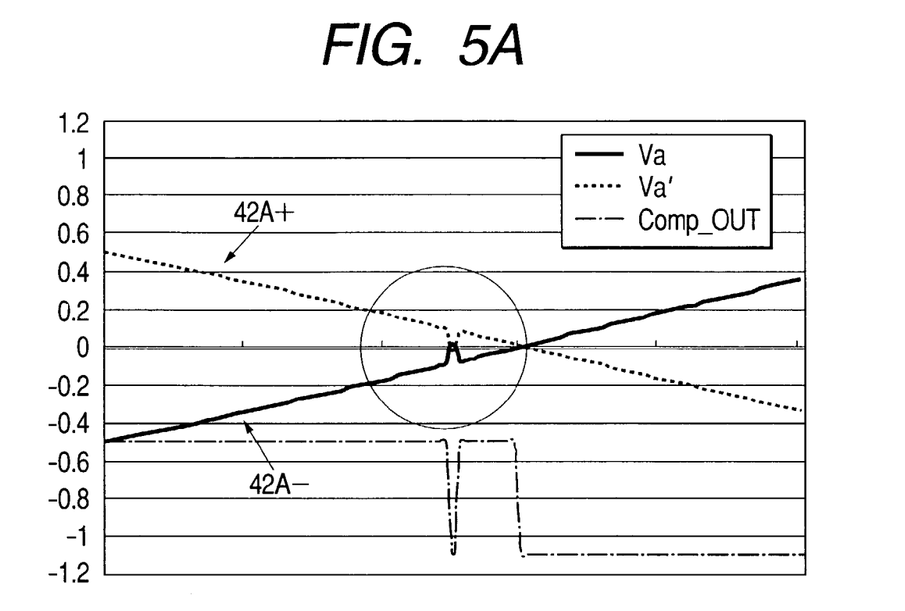
FIGS. 5A and 5B are respectively graphical representations useful in explaining the relationship between an input signal and an output signal of a comparator 42A in the second embodiment.
Figure 5B:
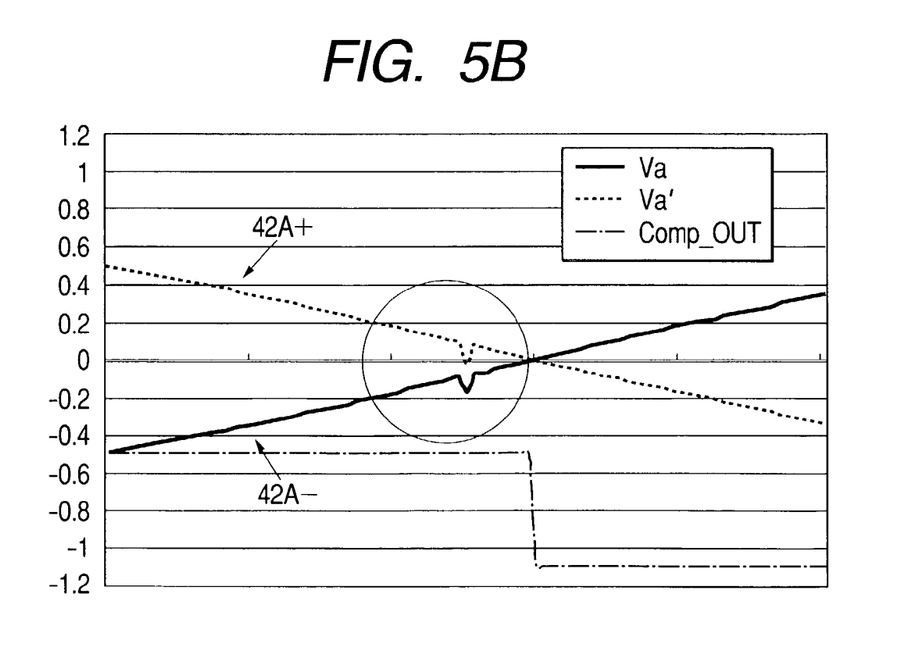

FIGS. 5A and 5B, similarly to FIGS. 2A and 2B, show the relationship between the input signal and the output signal of the comparator 42A in the present embodiment.

When we fear disturbance signals due to noises, since in the first embodiment, the noise components generated in the output signals A and B, respectively, are inputted to the resistor array after passing through the respective inversion amplifiers, even if the disturbance signals generated in the photodiode array and the signal processing circuit are inputted to the comparators after the differential operation is carried out therefor, they are not removed (refer to FIG. 5A).

However, in the second embodiment, since the signals corresponding in phase to 180° and 270°, similarly to the signals corresponding in phase to 0° and 90°, are arithmetically operated without through any of the inversion amplifiers, as shown in FIG. 5B, the disturbance signal to the non-inverting input of the comparator is in phase with the disturbance signal to the inverting input thereof. Consequently, if such a signal passes through the comparator, then the disturbance component is removed, and hence that signal does not suffer the influence of the disturbance noise.

As described above, the electrical division is carried out using the four output signals A to D, whereby it is possible to obtain the signal which shows the withstanding against the disturbance due to noises and also is free from the influence of the hysteresis in a comparator.

Third Embodiment

Figure 6:
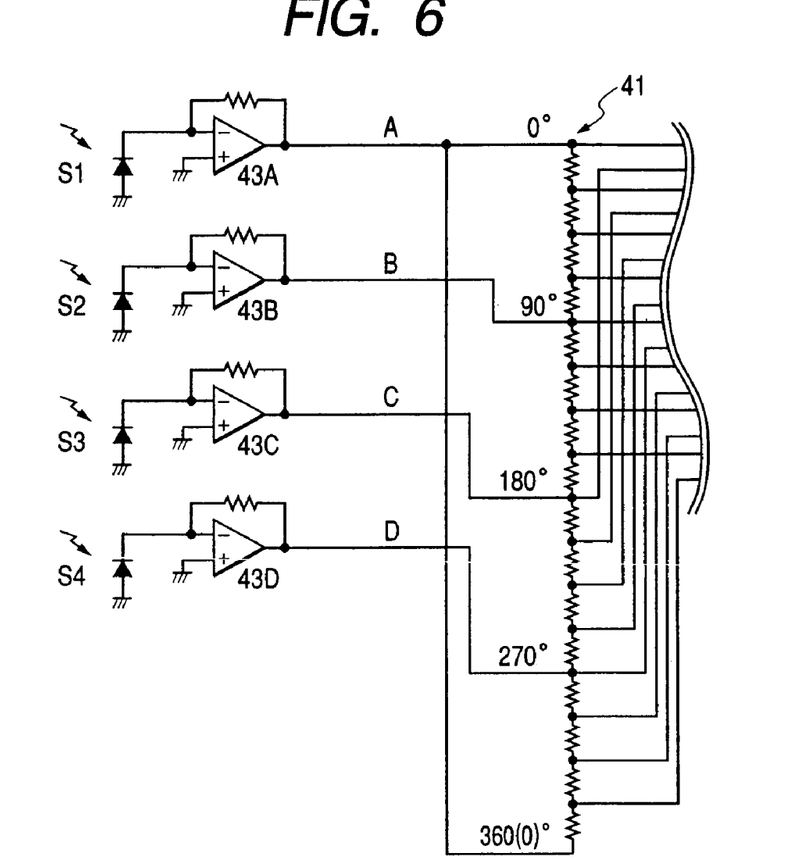
FIG. 6 is a circuit diagram showing a configuration of an electrical division circuit in a third embodiment of the present invention.

FIG. 6 is a circuit diagram showing a configuration of an electrical division circuit in a third embodiment of the present invention.

In the prior art example, and the first and second embodiments, the signals obtained after the I-V conversion are arithmetically operated in the respective differential amplifiers to be inputted to the electrical division circuit. However, in the present embodiment, after the output signals from the photodiode group consisting of the photodiodes S1, S2, S3 and S4 are subjected to the I-V conversion, the resultant signals are inputted to the electrical division circuit in their entirety.

While D.C. component signals of the photoelectric currents generated in the photodiodes S1 to S4 are changed in accordance with a quantity of light, these changes in the signals from the photodiodes S1 to S4 are equal to one another.

Thus, if such signals are inputted through the differential operation in comparators as in the circuit configuration of the present embodiment, then the influence of the D.C. components is cut to allow the objective comparator outputs to be obtained.

If such a circuit configuration is adopted, then the differential amplifiers become unnecessary to make it possible to reduce the number of components or parts. In addition, the removal of the differential amplifiers allows the error components contained in these amplifiers to be eliminated. As a matter of course, since the number of components or parts is reduced, it is possible to reduce the power consumption and the circuit scale.

Also, at this time, since the effects inherent in the present proposal are maintained, similarly to the present embodiment, it is possible to obtain a signal which shows the withstanding against the disturbance due to noises and also is free from the influence of the hysteresis in each comparator.

As set forth hereinabove, according to the present invention, in an electrical division circuit for use in an optical encoder, a circuit configuration of the present proposal is adopted, whereby it is possible to obtain a signal which shows the withstanding against the disturbance due to noises and also is free from the influence of the hysteresis in each comparator.

As many apparently widely different embodiments of this invention may be made without departing from the spirit and scope thereof, it is to be understood that the invention is not limited to the specific embodiments thereof except as defined in the appended claims.

What is claimed is:

1. An optical encoder, comprising:
   a scale having an optical grating formed thereon;
   a light source for irradiating the optical grating on the scale with light;
   photoelectric receiving elements for receiving light from the light source through or reflected from the optical grating on the scale to output signals corresponding to the received light; and
   a signal processing circuit, including an electrical division circuit and a plurality of comparators, for processing a pair of output signals having 90° phase difference with each other, the pair of output signals corresponding to the received light on the photoelectric receiving elements thereby detecting an amount of relative movement of the scale with respect to the photoelectric receiving elements, wherein the electrical division circuit receives a plurality of first signals relating to the pair of output signals and having the phase difference of 0°, 90°, 180°, and 270°, respectively, and outputs a plurality of second output signals having the divided phases of the first signals, and wherein a pair of signals, selected from the plurality of the second output signals having 180° different phases with each other and substantially equal amplitudes with each other, are inputted to a pair of input terminals of each of the plurality of comparators.

2. An optical encoder according to claim 1, wherein the photoelectric receiving elements are arranged in relation with the arrangement of the optical grating.

* * * * *